No. 770,104. PATENTED SEPT. 13, 1904.
F. PETERS.
HOT CORN FORK.
APPLICATION FILED JUNE 13, 1904.
NO MODEL.
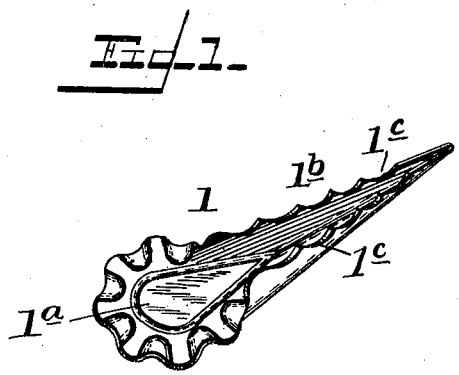
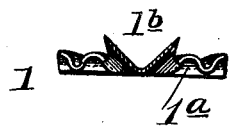
WITNESSES:
INVENTOR.
Frederick Peters
BY
Attorneys.

No. 770,104. Patented September 13, 1904.

UNITED STATES PATENT OFFICE.

FREDERICK PETERS, OF NEWARK, NEW JERSEY.

HOT-CORN FORK.

SPECIFICATION forming part of Letters Patent No. 770,104, dated September 13, 1904.

Application filed June 13, 1904. Serial No. 212,347. (No model.)

*To all whom it may concern:*

Be it known that I, FREDERICK PETERS, a citizen of the United States, residing at Newark, in the county of Essex and State of New Jersey, have invented new and useful Improvements in Hot-Corn Forks, of which the following is a specification.

My invention relates to improvements in devices particularly designed for table use, such as for aiding the holding of a cob with the corn thereon while eating therefrom. It has, primarily, for its object to carry out the aforesaid purpose in an effective and desirable way, while the invention is very simple, inexpensive, and readily manufactured.

Said invention consists of the detailed construction of the same, substantially as hereinafter more fully disclosed, and particularly pointed out by the claims.

In the accompanying drawings, illustrating the preferred embodiment of my invention, Figure 1 is a perspective view. Fig. 2 is a transverse section thereof.

In the carrying out of my invention I strike or stamp up, preferably as disclosed by Fig. 1, from malleable metal what I term a "fork" 1, with its end portion $1^a$ suitably adapted to be conveniently grasped by the fingers, being generally flat with a crimped or configurated marginal edge. The shank or engaging portion $1^b$ is tapering toward and vanishing at its outer end to provide for the ready insertion thereof into the article or edible to be upheld thereby—as, for instance, into the end of a cob with the corn thereon for eating therefrom. Said shank has in addition to the piercing or penetrating point as thus formed divergent longitudinal edges serrated or notched, as at $1^c$, while in itself it is preferably V-shaped in cross-section, the same cooperating with said serrated or notched surfaces or edges to aid in effectively securing its hold upon the cob when inserted thereinto as opposed to its accidental withdrawal from the cob. This may be further aided by turning the fork more or less when in the cob to cause its serrations to laterally embed themselves in the latter, as is apparent.

In practical use one fork may be employed or two be applied to the cob with the corn thereon, the same, as above noted, being stuck or inserted into the end or ends thereof, as the case may be, thus providing for the desirable and convenient holding of the edible and the revolving thereof, as in eating therefrom.

My invention is exceedingly simple, quickly applied, and cheaply made.

Latitude is allowed as to details herein, as they may be changed as circumstances suggest without departing from the spirit of my invention.

I claim—

1. A device of the character described having a tapering shank, V-shaped in cross-section, and a finger-engaging end portion.

2. A device of the character described having a tapering shank portion, V-shaped in cross-section, with the divergent longitudinal edges thereof notched or serrated.

In testimony whereof I have signed my name to this specification in the presence of two subscribing witnesses.

FREDERICK PETERS.

Witnesses:
 ERNST HIRRSCHOFF,
 FREEMAN WOODBRIDGE.